United States Patent Office 3,428,242
Patented Feb. 18, 1969

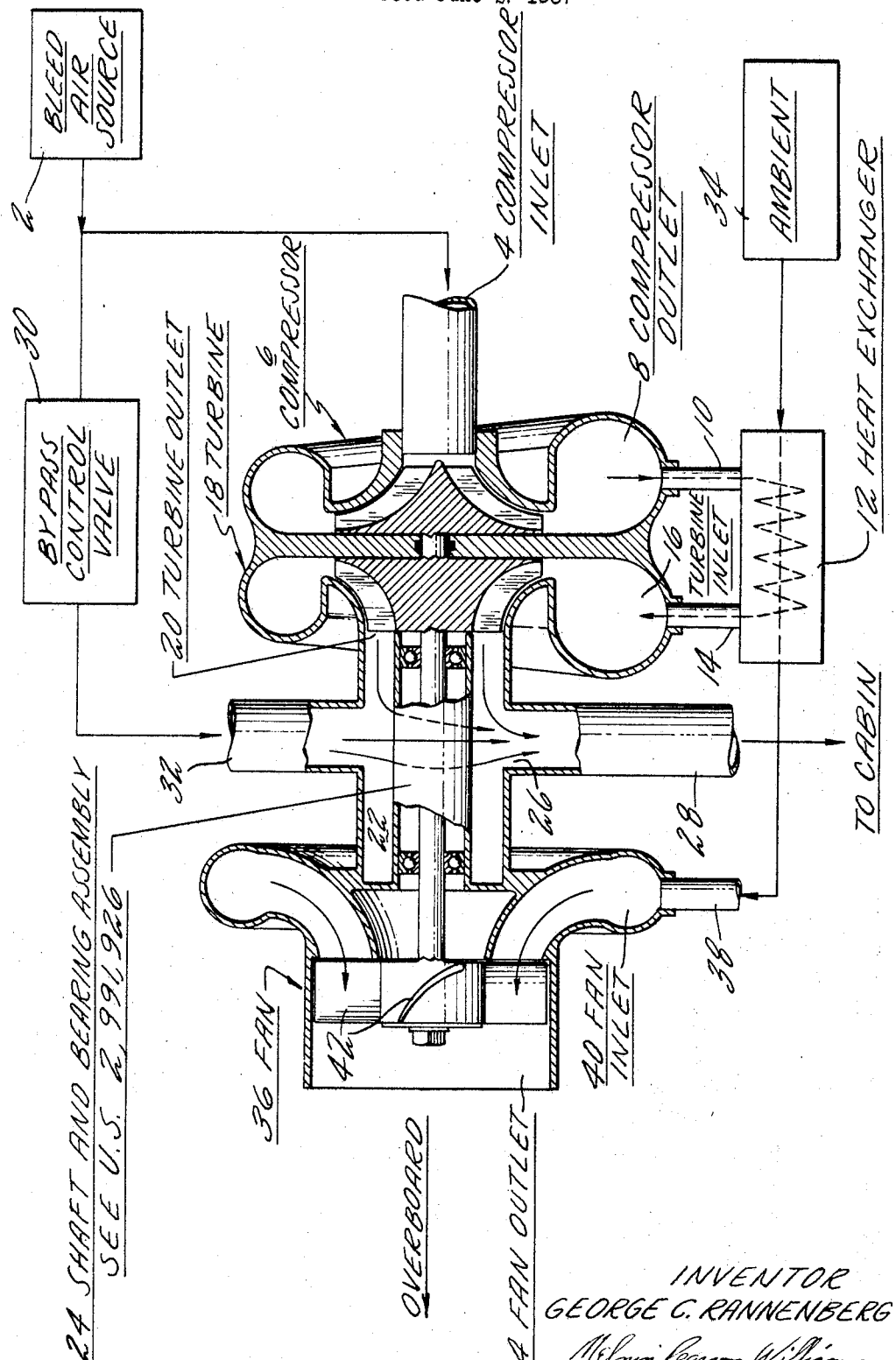

3,428,242
UNITARY SIMPLE/BOOTSTRAP AIR CYCLE SYSTEM
George C. Rannenberg, East Granby, Conn., assignor to United Aircraft Corporation, East Hartford, Conn., a corporation of Delaware
Filed June 2, 1967, Ser. No. 643,081
U.S. Cl. 230—116          3 Claims
Int. Cl. F01d 25/14; F04d 13/04

ABSTRACT OF THE DISCLOSURE

A single shaft, three-wheel machine includes a turbine which drives a compressor, the compressor receiving high pressure bleed air and passing it through a heat exchanger for driving the turbine, the air output of which is conditioned air for the cabin on an aircraft. Ram or ambient air used as a coolant is forced through the heat exchanger by a fan which is also driven by the turbine shaft. The single shaft design includes passing the cool, conditioned air over the bearings of the machine so as to operate at temperatures compatible with shaft lubrication, and deicing air for maintaining the turbine output slightly above freezing temperatures is supplied by a symmetrical cowl directly from the high pressure bleed air.

BACKGROUND OF THE INVENTION

*Field of invention.*—This invention relates to turbine/compressor air cycle systems, and more particularly to a combined simple cycle and bootstrap cycle in a single shaft air cycle machine.

*Description of the prior art.*—At the relatively high altitudes at which many modern aircraft fly, the ambient air is at too low a pressure for human comfort and safety. Therefore, it has been known to provide pressurized cabin air at a suitable temperature by utilizing bleed air, which is herein defined as any source of high pressure air in sufficient quantities so as to promote pressurized air conditioning for the cabin of an aircraft. Bleed air may be taken from the supercharger of a piston engine, from an auxiliary power unit or engine, or from a jet-type engine, so long as the air is bled upstream of any combustion process which would foul it.

The well-known principle of converting warm or hot high pressure bleed air to properly condition air for the cabin of the aircraft is to cause the high-pressure air to do work in a turbine, which lowers the temperature and pressure of the air. In the well known simple air cycle, the turbine in turn uses the rotary power created by the high-pressure air to drive a fan which pulls ram air or ambient air through a heat exchanger and then exhausts this air overboard. The bleed air is fed through the heat exchanger prior to entering the turbine so that the work performed by the turbine (which cools the air) is also used to produce cooling in the heat exchanger to further cool the air from the bleed. This system is known to be very inefficient since the turbine will do more work than the fan needs to absorb. The turbine is therefore not well loaded and therefore may tend to run away unless an inefficient fan is used so as to produce a sufficient braking action on the turbine.

Another known system which is far more efficient than the simple air cycle is the bootstrap air cycle system. In this system, the high pressure bleed air is fed to a compressor which in turn passes the air through the heat exchanger and then through the turbine to produce work. The term "bootstrap" comes from the fact that the compressor is fed to the turbine, but this results in lower temperatures out of the turbine. In the bootstrap cycle, due to the inefficiencies in the system and to the temperature drops therein, the turbine does not reclaim all the compressor work utilized in pumping the air up to a higher pressure, and therefore the system will stabilize. The compressor compresses the air which drives the turbine, and the turbine in turn drives the compressor, but the heat exchanger in such a bootstrap cycle has ram or ambient air forced through it by a fan which is either electrically driven, or driven by an additional turbine or by combined turbine/generator systems. Thus, the inherent efficiency of the primary bootstrap cycle brings about the need for additional air-moving equipment to drive the ram or ambient air through the heat exchanger. Furthermore, additional weight is required for the more complex bootstrap air cycle, and with more moving equipment (including at least an additional fan, and the driving equipment therefor), reliability is inherently lessened.

A partial solution to the problem of achieving the inherent efficiency of the bootstrap air cycle, without the need for auxiliary electrical fans or fans driven by auxiliary turbine equipment, has been provided by the use of a three-wheel fan/compressor/turbine machine in which both the fan and compressor are driven by turbine power.

However, three-wheel air cycle machines known heretofore have not had any material acceptance in the marketplace. This is believed to be due, primarily, to the cumbersome nature of the devices, and to the mechanical problems related thereto. In one such device, the heat exchanger is integrally formed therewith, and requires the use of an unduly long shaft. No three-wheel device has provided for deicing of the turbine outlet. Moreover, no three-wheel device has been properly designed for cooling of the shaft-supporting bearing thereof. Additionally such devices are not readily adapted for common usage for both right-hand mounting and left-hand mounting.

SUMMARY OF THE INVENTION

An object of the invention is provision of an improved combined and simple bootstrap cycle system.

Another object is to achieve the advantages of a three-wheel simple/bootstrap air cycle system by mitigating the mechanical difficulties therewith.

According to the present invention, a single shaft driven by the turbine turns the compresor and the fan utilized in a combined simple and bootstrap air cycle of the type which may find use in air-conditioning systems in aircraft, with the turbine exhaust passing over a shaft bearing assembly which is disposed adjacent the turbine on the shaft. In further accord with the present invention, turbine cooling of the shaft bearing is compatible with a machine which may be mounted in either a right-handed or left-handed fashion.

The invention provides for the inherent simplicity of combined turbine/compressor units known to the prior art, and the advantages of the combined simple-bootstrap air cycle system which has heretofore required a separate fan.

The foregoing and other objects, features and advantages of the present invention will become more apparent in the light of the following detailed description of preferred embodiments thereof as illustrated in the accompanying drawing.

BRIEF DESCRIPTION OF THE DRAWING

The sole figure herein comprises a simplified schematic partially sectioned elevation of an exemplary embodiment of the present invention.

DESCRIPTION OF THE PREFERRED EMBODIMENT

Referring to the figure, the bleed air source 2 supplies high temperature, high pressure air to an inlet 4 of an axial inflow centrifugal compressor 6, the outlet 8 of which supplies air at a higher temperature and pressure to the inlet 10 of a heat exchanger 12, the outlet 14 of which is connected to an inlet 16 of a radial inflow turbine 18. An outlet 20 of the turbine 18 passes into a turbine discharge housing such as a chamber 22 which completely encloses a shaft and bearing assembly 24 of the type disclosed in U.S. Patent No. 2,991,926, Combined Fan and Turbine, issued July 11, 1961 on an application filed Dec. 29, 1954 by W. E. Diefenderfer. An outlet 26 of the chamber 24 may be connected by a suitable duct 28 to supply air to the cabin in an airplane. The chamber 22 is also fed bleed air from the source 2 through a bypass control valve 30 and into an inlet duct 32. The bypass control valve 30 will control the amount of hot air fed directly from bleed air source 2 to the chamber 22 so as to maintain the temperature of the chamber 22 above freezing so as to prevent ice formations in the chamber 22 and in the outlet 26 thereof. As an alternative, the valve 30 may be positioned to supply deiced air to the turbine discharge housing (chamber 22) from the heat exchanger outlet, by conducting air from the outlet 14 thereof bypassing the turbine, directly to the chamber 22.

Air is drawn to the heat exchanger 12 from a source of ambient air 34 by a fan 36. As shown in the figure, the fan is arranged for radial inflow and axial outflow although the fan inlet and outlet can be interchanged, if installation dictates, by reversing the flow and the angle of the fan blades. The air is drawn from the heat exchanger 12 into an inlet duct 38 and to the inlet 40 of the fan 36, with the blades 42 forcing the air overboard through a fan outlet 44.

Briefly described, the combined simple/bootstrap air cycle system utilizes the compressor 6 to increase the pressure and temperature of the bleed air from the source 2, and the temperature is reduced in the heat exchanger 12. The cooler air is fed to the turbine 20, where its pressure and temperature are significantly reduced, and the turbine in turn is driven by the air so as to drive the compressor in the well-known bootstrap fashion. The turbine also drives the fan 36, which requires further work to be performed on the air by the turbine before the air is passed through the chamber 22 and over the duct 28 to the cabin. Since the power needed by the fan is only a portion of the turbine power, the excess power is delivered to the compressor to further increase turbine power, and cooling capacity of the turbine. The system is therefore very efficient, as described hereinbefore.

The mounting and lubricating of the shaft and bearing assembly 24 may be provided by those skilled in the art in the light of the teachings of the aforementioned Diefenderfer patent.

An important feature of the present invention is that the turbine is mounted (for example) inboard of the compressor 6 and the fan 36, whereby the turbine outlet is immediate adjacent a shaft and bearing assembly 24, and therefore supplies the coolest air in the system to cool the bearings of the shaft and bearing assembly 24. As a typical example of operation conditions which will maintain the bearings between 65° F. and 85° F. for long life, and provide a suitable amount of properly cooled air to the cabin of a large aircraft, consider a source of bleed air 2 which provides 167 pounds of air per minute at 225° F. to the compressor inlet 4. This air may be at a pressure of 36 p.s.i.a. The bleed air source in this example may be from a compressor of a turbofan engine, or from an auxiliary power unit capable of maintaining air conditioning in the aircraft cabin even when the aircraft is standing at a terminal with its main engines off.

In the example, the compressor will increase the temperature and pressure of the air to 344° F. and 55 p.s.i.a. This air will then pass through the heat exchanger 12 where it is cooled to a temperature of 120° F. at 53 p.s.i.a. Of course, the same amount of air (167 pounds per minute) enters the turbine as enters the compressor. The turbine extracts sufficient work from the air passing therethrough so that the temperature at the turbine outlet 20 which passes into the chamber 22 will be at 35° F. and the turbine expands the air to approximately 16 p.s.i.a. Because heat is generated in the shaft and bearing assembly 24, the temperature of the bearings will be in excess of the temperature at the turbine outlet 20. However, in this example, it is possible to maintain the temperature of the bearings at the turbine end of the shaft at approximately 65° F., and the temperature of the bearings at the fan end of the shaft will only be approximately 85° F. Thus it is seen that the present invention will provide the combined simple/bootstrap machine in one unit, while maintaining a highly reliable, maintenance free unit, in which the shaft temperatures are sufficiently low as not to interfere with lubrication of the parts therein. In order to achieve the operating conditions of the present example, the fan 36 may draw 407 pounds of air per minute from the ambient source 34 through the heat exchanger 12. Within the fan itself, the temperature at the inlet 40 may be 100° F., and the temperature at the outlet 44 may be approximately 108° F. Of course, these temperatures are sufficiently low as to not materially affect the operating temperatures of the shaft and bearing assembly 24.

In order to simplify the understanding of the present invention, the embodiment depicted in the figure and described herein passes air from the turbine outlet 20 and from the chamber inlet 32 directly around the shaft and bearing assembly 24. However, in certain utilizations of the present invention, it may be desirable to have a different airflow configuration at the turbine outlet 20, and therefore the nature and shape of the chamber 22 and the airflow therethrough may vary. It is however within the scope of this invention to utilize cooling fins or the metallic structures of a cast assembly to cool by conduction the shaft and bearing assembly 24 by means of the turbine outlet air. A significant feature is that the turbine is disposed adjacent the bearing assembly, and therefore the cool outlet of the turbine may be utilized for cooling the shaft and bearing assembly 24.

It is also possible that the fan 36 may have the blades 42 therein reversed so that air is drawn from ambient at the left in the figure and pushed through the heat exchanger and dumped overboard at the right of the figure. It is also within the scope of the invention to reverse the mountings of the fan and the compressor when useful to accommodate suitable configurations of equipment. As suggested by the embodiment shown in the figure, the invention is well suited to casting configurations in which the inlet 32 and the outlet 28 of the chamber 22 may be used reversibly so that the same unit can be mounted to either the right or left side of a symmetrical airframe without any loss in efficiency or practicality.

Additionally, the position of the fan outboard of the bearing assembly permits use of a radial inflow fan, which, with the arrangement of the turbine 18 and chamber 22 permit the turbine outflow to cool the bearings compatibly with a mechanical design that can be used as either a right-hand or left-handed unit. If the turbine 18 were to be mounted on the left end of the shaft, it would be reversely oriented so as to have its outflow directed toward the bearing. The compressor or fan would therefore require a complex shroud to carry the warmer air output therefrom away from the bearing, or outwardly from between the fan and compressor. In contrast, the arrangement of the present invention places the axial flow of the fan and the compressor at opposite ends of the shaft.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

Having thus described typical embodiments of the invention, that which is claimed as new and to be secured by Letters Patent of the United States is:

1. A single shaft, three-wheel machine adapted for use in a combined simple/bootstrap air cycle system, comprising:
   a shaft journaled in a bearing assembly, said bearing assembly comprising an annular structure disposed along a given length of said shaft inwardly from the ends thereof with at least one bearing disposed therein;
   a fan assembly having a rotor drivingly disposed on one end of said shaft;
   a compressor assembly having a rotor drivingly disposed on the end of the shaft opposite the fan;
   a turbine assembly having a rotor drivingly disposed on said shaft inwardly of said fan and said compressor, said turbine having an axial outlet adjacent to said bearing assembly;
   and a turbine discharge housing for receiving the output of said turbine, said housing disposed to direct the air outflow of the turbine toward said annular structure so as to cool a surface of said bearing assembly which is displaced radially from said bearing.

2. The machine of claim 1 including:
   duct means adapted to controllably receive hot air used in conjunction with the air cycle system, said duct means joining said turbine discharge housing to mix the hot air with the outflow of said turbine to thereby maintain the temperature in said housing means above freezing.

3. The machine of claim 2 wherein said housing and said duct means are integrally formed in a symmetrical manner whereby the inlet and outlet functions of portions thereof are interchangeable.

References Cited

UNITED STATES PATENTS

| | | | |
|---|---|---|---|
| 2,064,126 | 12/1936 | Schellens et al. | 230—116 |
| 2,083,167 | 6/1937 | Lamere | 103—87 |

ROBERT M. WALKER, *Primary Examiner.*